Oct. 9, 1951 — H. M. DODGE — 2,570,433
INJECTION MOLDING MACHINE
Filed Aug. 9, 1949 — 2 Sheets-Sheet 2

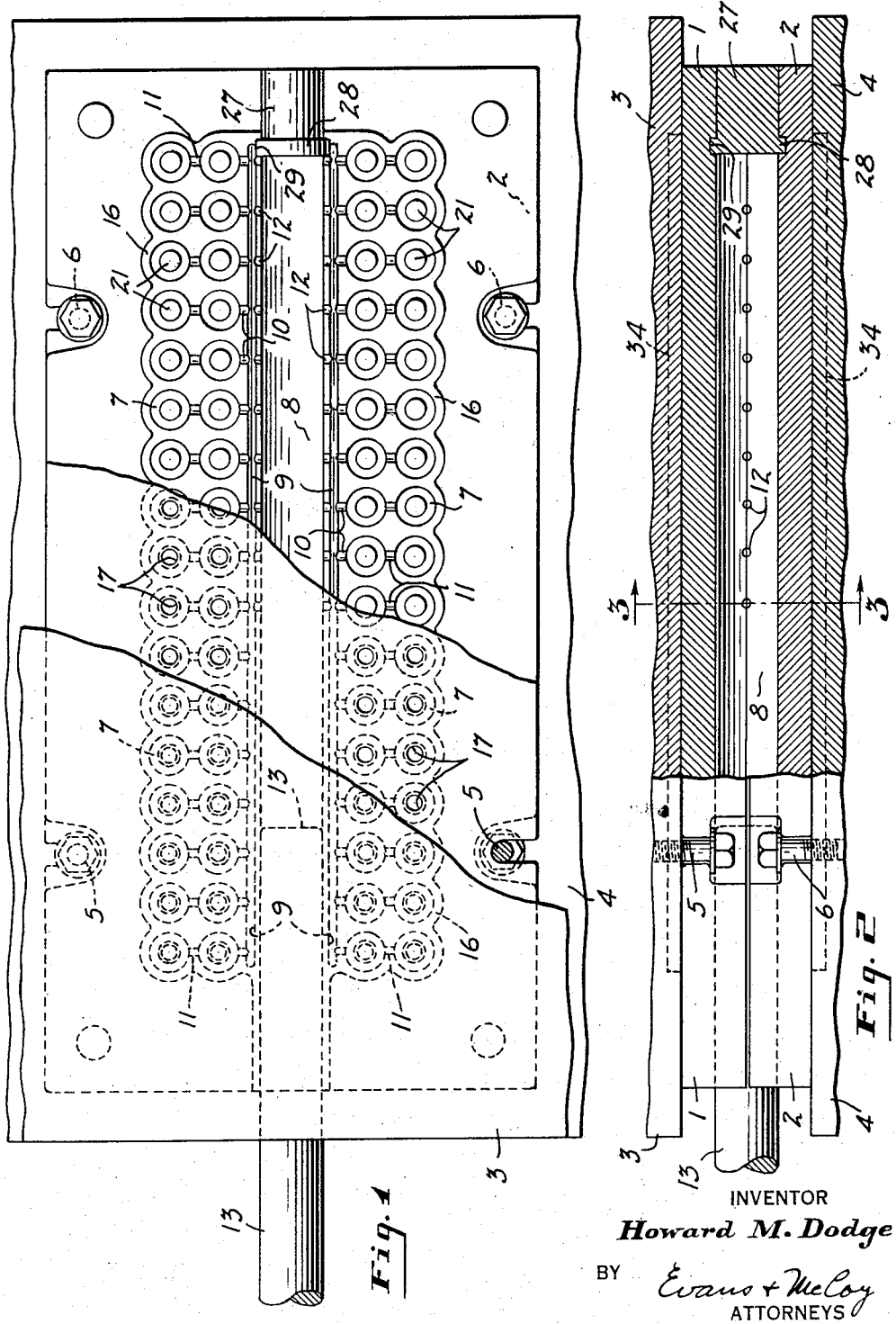

INVENTOR
*Howard M. Dodge*
BY *Evans & McCoy*
ATTORNEYS

Patented Oct. 9, 1951

2,570,433

UNITED STATES PATENT OFFICE 2,570,433

INJECTION MOLDING MACHINE

Howard M. Dodge, Wabash, Ind., assignor to The General Tire and Rubber Company, Akron, Ohio, a corporation of Ohio Application August 9, 1949, Serial No. 109,279

8 Claims. (Cl. 18—42)

1

This invention relates to injection molding machines and more particularly to a machine for molding and vulcanizing a large number of small rubber articles simultaneously.

Heretofore injection molding of small rubber articles has been unsatisfactory since it has been found difficult to obtain uniform filling of all the mold cavities and uniform curing of the rubber articles, and a high percentage of the injection molded rubber articles were defective.

The present invention has for its object to provide a machine in which a large number of mold cavities are filled with plastic vulcanizable material rapidly and substantially simultaneously and in which the pressure on the plastic material is substantially equalized throughout the extent of the mold, so that all cavities of the mold are properly filled and all of the rubber in the mold is uniformly heated.

With the above and other objects in view, the invention may be said to comprise the machine as illustrated in the accompanying drawings and hereinafter described, together with such variations and modifications thereof as may be apparent to one skilled in the art to which the invention pertains.

Reference should be had to the accompanying drawings forming a part of this specification, in which:

Figure 1 is a plan view of the injection mold with portions of the upper mold and press platens broken away to show portions of the top and bottom mold platens;

Figure 2 is a side elevation of the mold with a portion broken away and shown in central longitudinal section;

Figure 3:
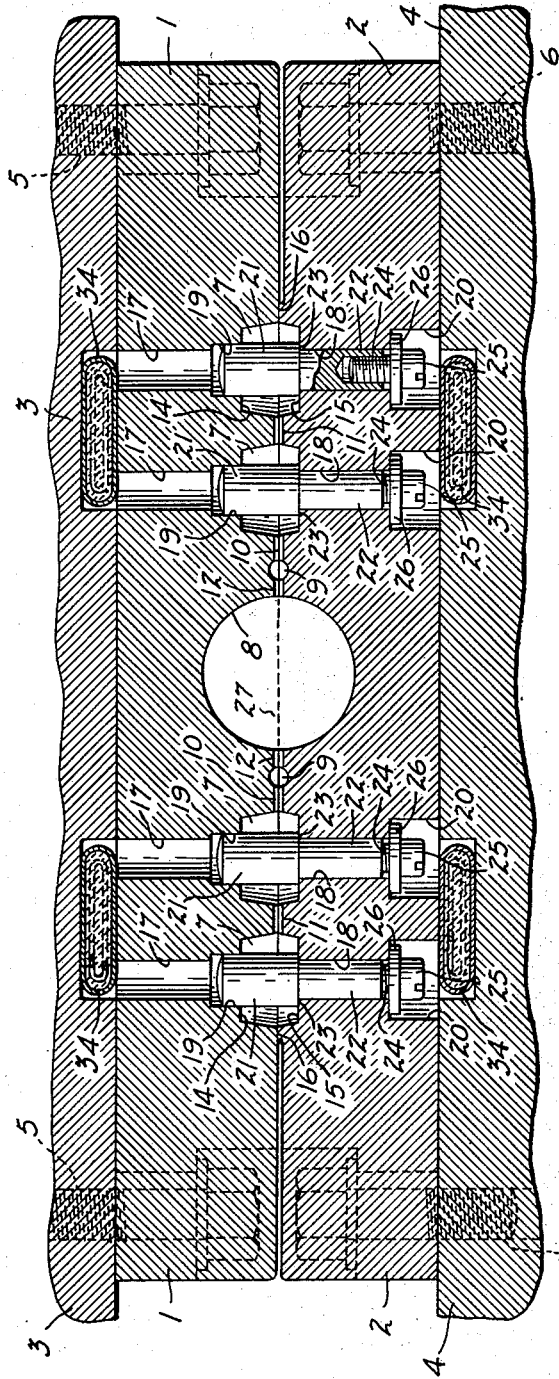
Fig. 3 is a transverse section on an enlarged scale taken on the line indicated at 3—3 in Fig. 2.

Referring to the accompanying drawings, the injection mold comprises upper and lower mold platens 1 and 2 that are attached to upper and lower press platens 3 and 4 by means of attaching bolts 5 and 6. The mold platens when in engagement form between them a series of mold cavities 7. A typical arrangement is illustrated in Fig. 1 which shows the mold cavities arranged in two spaced longitudinally extending groups that are disposed upon opposite sides of an elongated injection chamber 8 from which the plastic vulcanizable material is forced into the mold cavities 7.

2

Elongated pressure equalizing passages 9 are provided along opposite sides of the injection chamber 8 and these passages extend throughout the length of the groups of mold cavities, each being positioned between one of the groups of mold cavities and the injection chamber 8. The mold cavities 7 are preferably arranged in longitudinal rows parallel to the injection chamber and each group may comprise a plurality of rows of mold cavities. For purposes of illustration, groups of two rows each are shown but it is to be understood that the groups may include more than two rows. Short lateral passages 10 connect each of the equalizing passages 9 with each of the mold cavities 7 in the longitudinal row adjacent thereto and short lateral passages 11 connect the mold cavities 7 of outer rows to the mold cavities of the adjacent row that is disposed inwardly thereof. The equalizing passages 9 are connected to the injection chamber 8 by longitudinally spaced lateral passages 12, and the material is forced from the injection chamber 8 by means of a plunger 13 that extends into one end of the chamber 8 and has a sliding fit therein.

In order to prevent leakage of rubber past the plunger 13, the passages 12 are omitted for a considerable distance from the end of the cavity 8 into which the plunger 13 extends. As shown in Fig. 1, the passages 12 are in alinement with the passages 10 from the closed end of the injection chamber 8 to somewhat beyond the central portion of the chamber, the passages 12 being all remote from the mold cavities nearest the end of the injection chamber which receives the plunger 13. The plastic vulcanizable material is forced by the plunger 13 laterally through the passages 12 into the longitudinal pressure equalizing passages 9, and from the passages 9 substantially simultaneously into all the mold cavities throughout the length of the mold.

The construction of the individual molds depends upon the shape of the article to be molded. Cores may or may not be required and the location of the cavity with respect to the parting plane may vary. For some articles it may be necessary to locate the cavity wholly within one of the platens and for others it may be necessary to employ registering recesses in the two platens. For purposes of illustration a mold for tubular articles with oppositely tapered end portions is shown.

As shown in Fig. 3, the mold cavities of the injection chamber, the equalizing passages and the lateral connecting passages are all formed by registering recesses in the meeting faces of the mold platens 1 and 2. The mold cavities 7 are formed by registering recesses 14 and 15 in the top and bottom mold platens, and the top face of the bottom platen 2 is provided with a raised land 16 around the mold cavities and along the side of the passages 9 and chamber 10 that engages with the flat bottom face of the top platen 1.

The top and bottom platens are provided with alined vertical bores 17 and 18 opening to the top and bottom faces thereof and to the recesses 14 and 15 centrally thereof, the bores 17 being provided with counterbores 19 at the tops of the recesses 14, and the bores 18 being provided with counterbores 20 opening to the bottom face of the lower mold platen 2.

Cylindrical core members 21 are positioned in the mold cavities 7 with their upper ends fitting in the counterbores 19, the cores 21 being provided with stems 22 of reduced diameter that fit in the bores 18 of the bottom mold platen, the cores 21 also having shoulders 23 that seat upon the bottom faces of the recesses 15 of the bottom mold platens. The cores are held in place by means of screws 24 that engage in threaded openings in the lower ends of the stems 22 and that have heads 25 at their lower ends that engage washers 26 that bear against the upper ends of the counterbores 20.

The end of the injection chamber 8 opposite that into which the plunger 13 extends is closed by suitable means such as a plug 27 having an enlarged head 28 that fits in transverse grooves 29 formed in the semi-cylindrical recesses of the mold platens which form the injection chamber 8.

Figure 4:
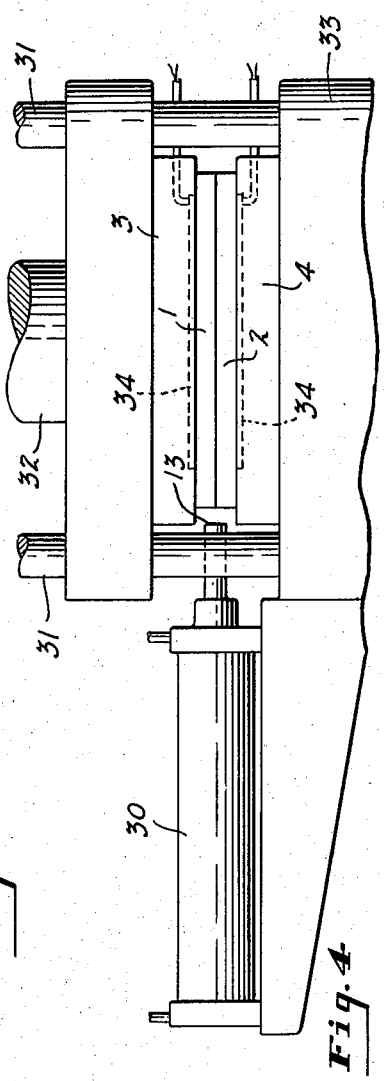
Fig. 4 is a fragmentary view showing the operating cylinder for the injection plunger and a portion of the press in which the mold platens are mounted.

The plunger 13 may be operated by any suitable means capable of imparting a long stroke and maintaining a high pressure. As shown in Fig. 4 of the drawings, the plunger 13 is operated by a suitable fluid pressure cylinder 30 while the mold platens are clamped together between the press platens 3 and 4, the upper platens 3 of the press being mounted for vertical movement on suitable guides 31 and being operated by a ram 32 while the lower platen 4 is supported in fixed position on a suitable base 33.

The mold platens are heated by suitable means such as electrical heaters 34 mounted in the press platens and the mold is maintained at a substantially uniform vulcanizing temperature throughout the operation. The injection stroke creates a substantially uniform flow to all parts of the mold through the pressure equalizing passages 9, and the full stroke of the plunger 13 may be effected in a relatively short period of time, usually fifteen to twenty-five seconds. Since all of the mold cavities are completely filled and the plastic material placed under uniform pressure in this short period of time, the curing of the rubber is substantially uniform throughout the entire mold.

In operation an elongated cylindrical piece of plastic vulcanizable material of approximately the same diameter and length as the injection chamber 8 is placed in the semicylindrical groove of the lower platen 2, after which the mold is closed by operation of the ram 32 and the injection plunger 13 is advanced by means of the fluid pressure cylinder 30. After the stroke of the plunger 13 is completed the mold is held closed for the period of time required for vulcanization. The time required for vulcanization is dependent upon several factors such as the size of the articles being molded, the vulcanizable composition, and the nature of the acceleration employed. With a mold such as herein illustrated the vulcanization time may be as little as from one and one-half to two and one-half minutes.

It is to be understood that in accordance with the provisions of the patent statutes, variations and modifications of the specific devices herein shown and described may be made without departing from the spirit of the invention.

What I claim is:

1. An injection molding machine comprising a mold having a row of mold cavities, and means for injecting plastic material into said cavities comprising an elongated injection chamber closed at one end and positioned alongside said row of cavities, an injection plunger slidably fitting in said chamber and movable toward said closed end, an elongated pressure equalizing passage alongside said chamber, lateral passages connecting said equalizing passage to said mold cavities and longitudinally spaced lateral passages connecting said injection chamber to said equalizing passage, said passages opening to said chamber at longitudinally spaced points so that they are successively closed by said plunger during the injection stroke.

2. An injection molding machine as set forth in claim 1 in which the lateral passage from the injection chamber to the equalizing passage first closed by the injection plunger during its injection stroke is remote from the ends of said equalizing passage.

3. An injection molding machine as set forth in claim 1 in which a second row of mold cavities is provided and in which each mold cavity of the second row is connected by a passage to a mold cavity of the first row.

4. An injection molding machine as set forth in claim 1 in which a second equalizing passage and a second row of mold cavities are provided along the side of the injection chamber opposite the first equalizing passage and in which the second equalizing passage is connected by lateral passages to the injection chamber and to the mold cavities of the second row.

5. An injection molding machine comprising a pair of separable mold platens forming between them a row of mold cavities, and means for injecting plastic material into said cavities comprising an elongated injection chamber, an elongated pressure equalizing passage between said chamber and said row of mold cavities, lateral passages connecting said equalizing passage to said mold cavities and longitudinally spaced passages connecting said injection chamber to said equalizing chamber, said equalizing passage extending the full length of said row of mold cavities and alongside the same, and an injection plunger slidably fitting in said injection chamber and acting to successively close said spaced passages during the injection stroke.

6. An injection molding machine as set forth in claim 5 in which the passage from the injection chamber to the equalizing passage first closed by the plunger during the injection stroke is remote from the ends of said equalizing passage.

7. An injection molding machine comprising a pair of separable mold platens having registering cavities in their meeting faces forming an elongated injection chamber, an elongated pressure equalizing passage along each side of said injection chamber, a group of mold cavities alongside each equalizing passage and extending the full length thereof, longitudinally spaced passage connecting said chamber to each of said equalizing passages, lateral passages spaced throughout the length of each equalizing passage and connecting the same to certain of the mold cavities and passages connecting other mold cavities to mold cavities to which said lateral passages are connected, and a plunger in said injection chamber for forcing plastic material from said chamber and through the said passages to said mold cavities and acting to successively close said spaced passages during the injection stroke.

8. An injection molding machine as set forth in claim 7 in which the spaced passages connecting the injection chamber to the equalizing passages that are first closed by the plunger during the injection stroke are remote from the ends of the equalizing passages.

HOWARD M. DODGE.

REFERENCES CITED

The following references are of record in the file of this patent:

UNITED STATES PATENTS

| Number | Name | Date |
|---|---|---|
| 2,347,773 | Franz | May 2, 1944 |
| 2,476,558 | Moxness | July 19, 1949 |
| 2,501,863 | Cox | Mar. 28, 1950 |